United States Patent [19]
Highberg et al.

[11] 3,828,479
[45] Aug. 13, 1974

[54] MULTIPLE SPINDLE CLUSTER FOR SHEET GLASS CORE DRILLING MACHINE

[75] Inventors: Carle W. Highberg, Sylvania; George R. Roesch, Sylvania Twp., both of Ohio

[73] Assignee: Engelhard Minerals & Chemicals Corporation, Murray Hill, N.J.

[22] Filed: May 17, 1973

[21] Appl. No.: 361,268

[52] U.S. Cl.................. 51/81 R, 125/20, 408/39
[51] Int. Cl....... B23b 41/00, B24b 7/00, B28b 1/02
[58] Field of Search........... 408/204, 87, 39, 40, 41; 51/80 R, 81 R; 125/20; 173/52

[56] References Cited
UNITED STATES PATENTS
3,461,615   8/1969   Ferguson.......................... 51/81 R
3,746,459   7/1973   Kindeland.......................... 408/37

Primary Examiner—Othell M. Simpson

[57] ABSTRACT

A multiple spindle cluster assembly for use in association with a core drilling machine to drill a plurality of holes simultaneously in a glass sheet. A pair of such identical cluster assemblies are located on opposite sides of the sheet with the respective pairs of opposed spindles axially aligned. The respective drills are fed alternatingly into the sheet to a depth less than the thickness of the glass. Each assembly includes an adapter and at least one spindle clamp attachable to the adapter to support the spindles in parallel alignment and in a predetermined pattern and spacing relative to one another. The spindles are adjustable in an axial direction relative to one another to position the drill tips in a common plane parallel to the plane of the glass sheet.

8 Claims, 8 Drawing Figures

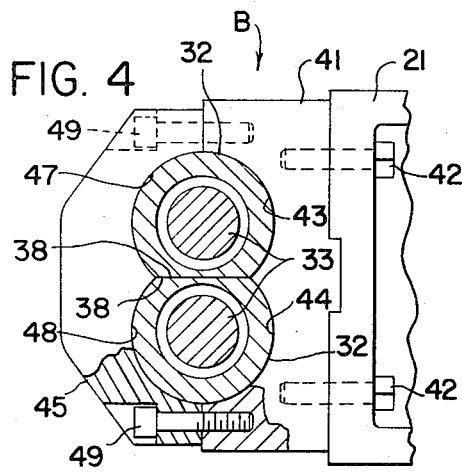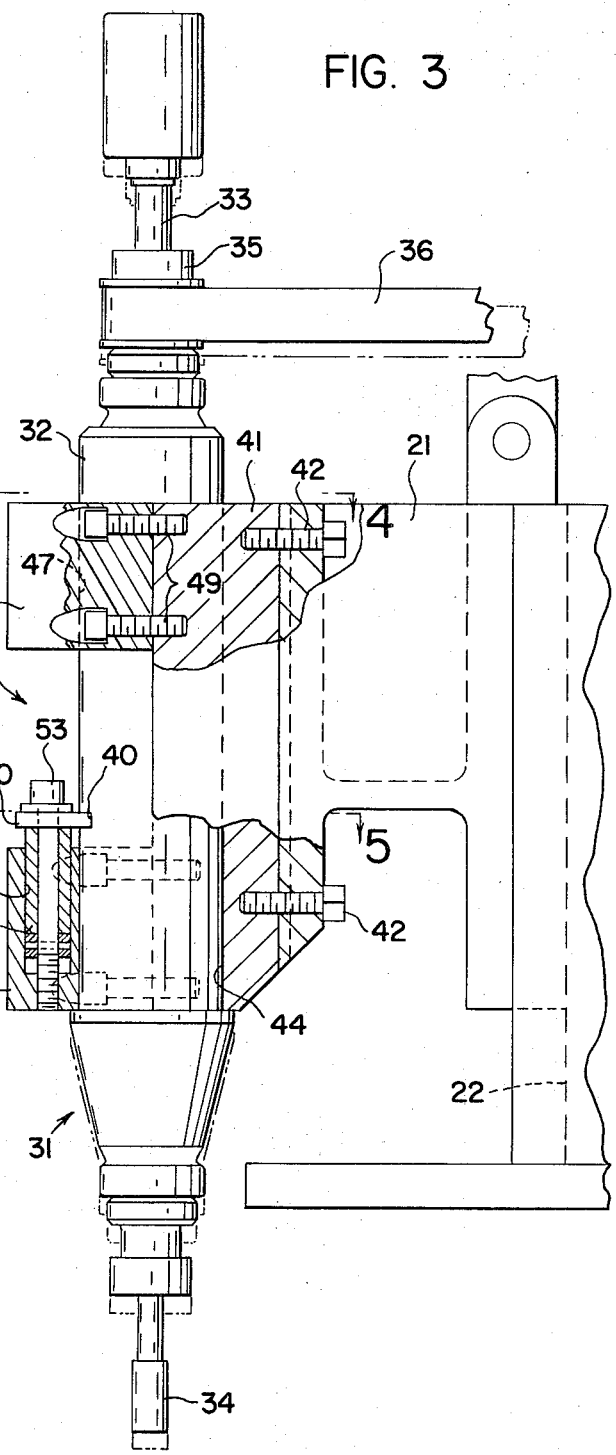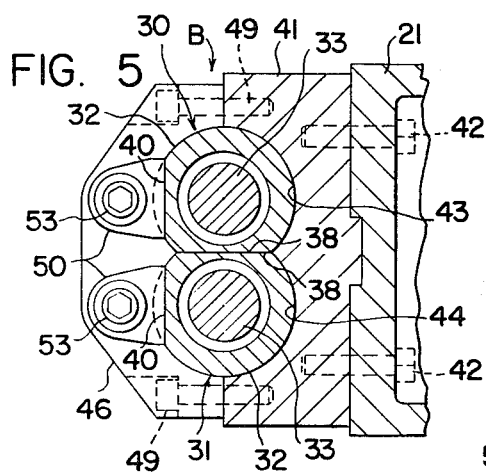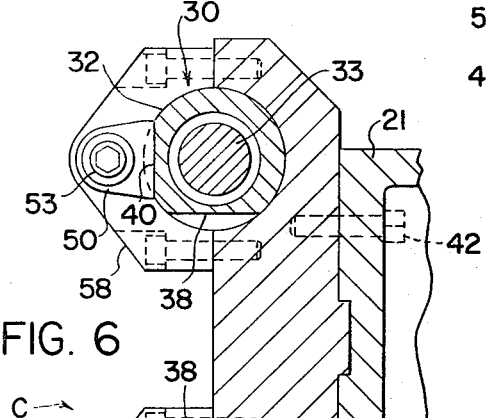

MULTIPLE SPINDLE CLUSTER FOR SHEET GLASS CORE DRILLING MACHINE

CROSS REFERENCE TO RELATED APPLICATION

This application relates to and incorporates by reference the earlier filed copending application Ser. No. 345,883 of the present inventors entitled "Sheet Glass Core Drilling Machine" filed Mar. 29, 1973.

BACKGROUND OF THE INVENTION

This invention relates to the drilling of sheets of glass and glass-like material using, for example, diamond grit-type core drills and the like. More particularly the invention relates to a core drilling machine adapted to drill a plurality of holes in a glass sheet simultaneously in a predetermined pattern and spacing, and especially to a multiple spindle cluster adapter with maans for very accurately positioning the respective spindles and drills with the drill tips in a common plane parallel to the glass sheet. The invention has particular utility in connection with the drilling of several holes in automobile door lites as is required in the case of door window glass for many current U.S. makes of automobiles, as well as in the case of lites for patio doors and the like.

In drilling a single hole in sheet glass and other hard refractories the conventional procedure is to use two cooperating coaxial drills that are advanced into the glass alternatingly from opposite sides of the glass sheet. The glass sheet is firmly clamped in the machine and cooling water is supplied to the region around the area to be cut. It is necessary that precise control of the core drill travel or depth of cut be achieved in order to assure that the drilling from at least one side stops at the proper depth.

In some circumstances several holes are drilled in close proximity to one another and in order to accomplish this, complex fixtures must be designed and used to position the glass sheet properly relative to the path of the drill so as to locate each hole in a proper predetermined pattern and spacing relative to the other holes. This operation is, however, complicated for an operator and time consuming as well.

One technique for drilling multiple holes in a glass sheet more efficiently is to use several drilling machines including one for each hole, positioned close together and operable simultaneously. A group of core drilling machines of the type described in the aforesaid earlier filed application of the present inventors may be so arranged and used in this manner.

The operating cycles of the machines are synchronized and the respective drills are adjusted and controlled according to the novel control mechanism of the machines to keep the drill tips feeding into the glass at a constant feed rate and in a common plane parallel to the sheet.

This arrangement, however, is extremely expensive due to the number of machines necessarily involved and is severly limited as to the closeness of the hole spacings that may be obtained.

Another possible solution to the problem that seems feasible on the surface is the use of multiple spindles and drills in a single machine. The principal problems that arise in connection with this technique, however, are that because the drills themselves may have different degrees of wear and may vary somewhat in configuration and dimension from drill to drill, the drill tips do not usually lie in a common plane parallel to the surface of the glass sheet even though the spindles are carefully mounted at the same level or axial position in the machine.

Another problem is that the more conventional constant pressure-type machines do not provide sufficient pressure to feed a plurality of drills in view of the considerably higher loads that must be dealt with. Also, because of the diameter of conventional spindles, closeness of hole spacings is limited.

Thus prior attempts to utilize multiple spindle machines have been unsatisfactory because of the inability to handle the high loads involved and because in drilling glass it is extremely important that if holes are being drilled simultaneously the drill tips enter the glass concurrently and proceed to essentially the same depth of cut. Variations in these conditions result in incomplete drilling of some holes or in glass breakage do to stresses caused by uneven forces during drilling.

The multiple spindle cluster assembly of the present invention, however, resolves the difficulties indicated above and affords other features and advantages herefore not obtainable.

SUMMARY OF THE INVENTION

It is among the objects of the invention to drill a plurality of holes simultaneously in a glass sheet using a single drilling machine.

Another object is to drill a plurality of holes in a predetermined pattern and spacing relative to one another, in a glass sheet while the sheet is stationary.

Still another object is to provide a multiple spindle cluster assembly for use in association with a glass sheet core drilling machine wherein the tips of the respective drills are adjustable to and maintained in a common plane parallel to the glass sheet to be drilled.

These and other objects and advantages are accomplished by means of the novel multiple spindle cluster assembly of the invention wherein a pair of the assemblies are supported in a single drilling machine and located on opposite sides of the glass sheet to be drilled. The assemblies are fed alternatingly toward and into the sheet so that the total cutting of respective pairs of coaxial drills on opposite sides of the sheet completes a cut and removes a core.

Each of the drilling assemblies is mounted on a reciprocable slide that is driven by the machine and each slide carries a plurality of spindles and drills together with associated drive means operably connected to the spindles for turning the drills at like speeds. A specially designed adapter is connected to the slide and one or more spindle clamps attachable to the adapter are used to support the spindles to be moved with the slide with their respective axes parallel and in a predetermined pattern and spacing relative to one another. An adjusting means is operatively associated with one or more of the clamps for adjusting the spindles axially relative to one another so that the drill tips are positioned in a common plane parallel to the glass sheet.

The adjusting means in the preferred form includes a transverse slot cut in the spindle housing and adapted to be engaged by a key adjustably amounted on the clamp. An adjusting screw that supports the key is threaded into a bore in the clamp, the screw having its axis parallel to the axis of the spindle. The screw permits axial adjustment of the spindle relative to the adapter and clamp.

Where the hole spacings are closer than the housing for two spindles will permit, the housings are machined to remove material from the cylindrical wall thereof and provide a flat surface which when the two surfaces are mated, will permit a minimum spacing between the holes to be drilled.

According to this system identical adapters must be designed for each drilling assembly to provide the desired predetermined hole pattern and spacing, however, the same spindle clamps may be used with different adapters. The adapters may be easily removed from the slide when a new pattern is to be set up.

BRIEF DESCRIPTION OF THE DRAWINGS

FIG. 3 is a fragmentary elevational view on an enlarged scale of the multiple spindle cluster assembly of the machine of FIG. 1 with parts broken away and shown in section for the purpose of illustration;

FIG. 4 is a fragmentary sectional view taken on the line 4-4 of FIG. 3 with parts broken away for the purpose of illustration;

FIG. 5 is a fragmentary sectional view taken on the line 5—5 of FIG. 3;

FIG. 6 is a fragmentary sectional view drawn to the same scale as FIGS. 4 and 5 and illustrating an alternative form of multiple spindle cluster assembly embodying the invention;

DESCRIPTION OF THE PREFERRED EMBODIMENT

Figure 1:
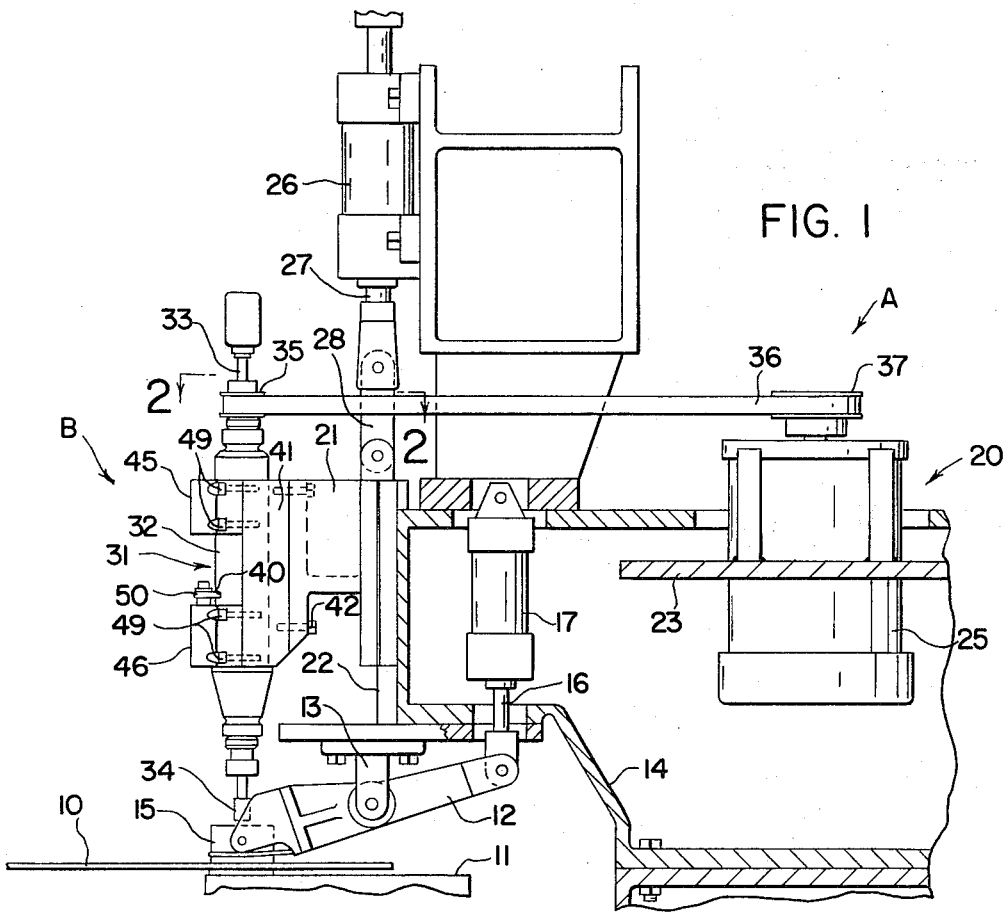
FIG. 1 is a fragmentary elevational view of a sheet glass core drilling machine having a multiple spindle cluster assembly mounted therein in accordance with the invention.
Figure 2:
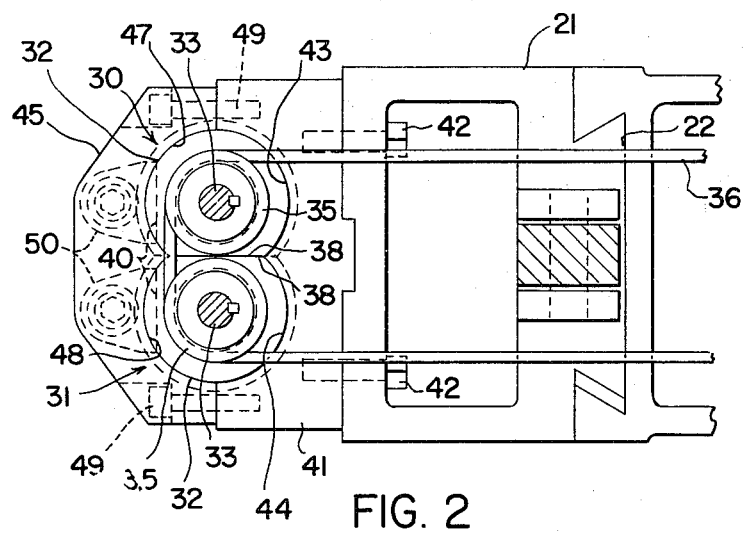
FIG. 2 is a fragmentary sectional view taken on the line 2—2 of FIG. 1.

Referring more particularly to the drawings and initially to FIGS. 1 to 5 there is shown a portion of a drilling machine A with a spindle cluster assembly B associated therewith. While only one spindle cluster assembly B is shown it will be understood that the machine has two identical spindle cluster assemblies including the upper cluster assembly B and an identical lower cluster assembly (not shown). The assemblies are adapted for vertical travel alternatingly toward and away from one another through a core drilling cycle.

The machine receives a horizontal glass sheet 10 which is held and positioned during the drilling operation by means of a supporting table 11 and a clamping lever 12. The clamping lever 12 is pivotally connected to a bracket 13 bolted the frame 14 for the machine A. A pair of clamping jaws 15 with holes to accommodate each of the drills of the spindle cluster assembly B are pivotally connected to the bifurcated outer end of the clamping lever 12. The table 11 also has a pair of holes for the drills of the lower spindle cluster assembly.

The clamping jaws 15 are moved by the lever 12 toward and away from the table 11 to grip and hold the glass sheet 10 in the marginal zones surrounding the locations of the respective holes to be drilled. The clamping lever 12 is pivotally connected at its opposite or inner end to a connecting rod 16 from the piston of a clamping cylinder 17.

The machine A has a pair of carriage assemblies movable alternatingly toward and away from one another and including an upper carriage assembly 20 (FIG. 1) and a lower carriage assembly (not shown). Both carriage assemblies are essentially identical and, therefore, the present description will be directed only to the assembly 20. The assembly 20 is identical in most respects to that shown in the aforementioned earlier filed application of the present inventors and includes a slide 21 guided for vertical movement in a dovetail guide 22 attached to the frame 14. A horizontal platform 23 is connected to the slide 21 and is adapted to support a drive motor 25. The slide 21 is reciprocated by a drive cylinder 26 with a piston rod 27 connected to a link 28 that in turn is pivotally connected to the top of the slide 21.

A pair of spindles 30 and 31 are carried by the slide 21 and are closely spaced to one another to drill two closely spaced holes simultaneously. The spindles 30 and 31 each comprise a housing 32 with appropriate bearings etc. provided therein for the spindle shaft 33, and a drill 34 mounted in a chuck attached to the spindle shaft 33. A pulley 35, keyed to the upper end of the shaft 33, is adapted to be turned by a belt 36 that extends to a drive pulley 37 of the drive motor 25.

Each of the housings 32 is machined to provide a flat surface 38, the flat surfaces of the respective spindles 30 and 31 engaging one another so that the drills 34 may be positioned as closely as possible to one another. Also each housing 32 is provided with a transverse slot 40 for use in making axial adjustment of the spindles relative to one another as will be hereinafter described.

The spindles 30 and 31 are mounted in proper lateral spacing relative to one another by means of a specially designed adapter 41 attached to the slide 21 by machine screws 42. The adapter 41 has two cylindrical recesses 43 and 44 formed therein with a radius identical to the radius of the housings 33. An upper spindle clamp 45 and a lower spindle clamp 46, each with two recesses 47 and 48 identical to the recesses 43 and 44, are attached to the adapter 41 with machine screws 49 to clamp the spindles 30 and 31 in the desired position relative to one another.

The lower spindle clamp 40 has a pair of keys 50, each of which is received in a slot 40 of one of the spindles 30 and 31. The dimensions of each key 50 match the size of the respective slot 40 so that there is very little play in an axial direction. Each key 50, as best illustrated in FIG. 3, rests on a sleeve 51 slidably received in a bore 52 formed in the spindle clamp 46 and a bolt 53 extends through a key, and through the sleeve to a threaded opening in the clamp 45. By turning the bolt 53 the key 50 may be raised or lowered relative to the lower spindle clamp 46 and in turn the respective spindle 30, 31 will be raised or lowered relative to the other spindle to adjust the axial positon of the tip of the drill 34. Thus the tips of both drills 34 may be adjusted so as to be in a common plane parallel to the glass sheet 34.

FIG. 6 illustrates an alternative arrangement utilizing a multiple spindle cluster assembly C wherein another specially made adapter 55 positions and holds the same pair of spindles 30 and 31 but with their axes spaced a greater distance from one another as compared to the embodiment of FIGS. 1 to 5. Two separate lower spindle clamps 58 and 59 as well as two upper spindle clamps (not shown) are attached to the adapter 55 to secure the spindles 30 and 31. Each lower spindle clamp 58, 59 has a key 50 and associated structure as in FIG. 3, to permit axial adjustment of the spindles.

Figure 8:
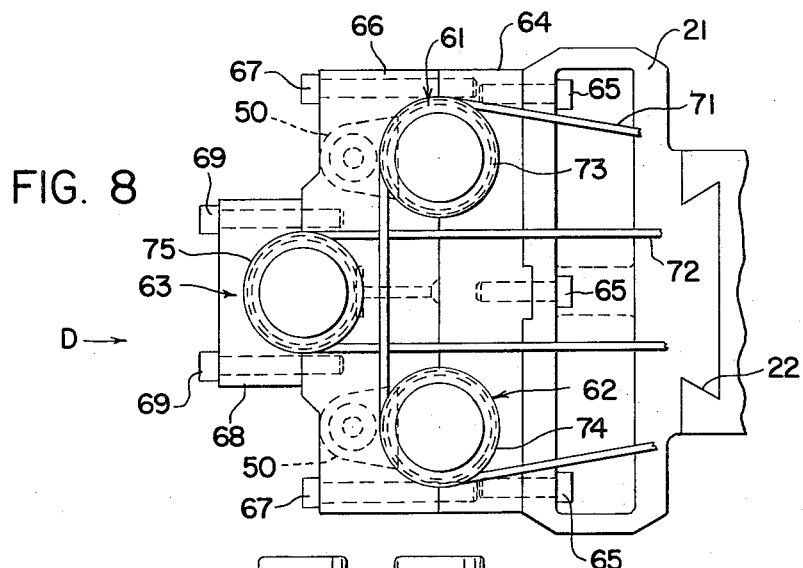
FIG. 8 is a fragmentary plan view of the multiple spindle cluster assembly of FIG. 7.
Figure 7:
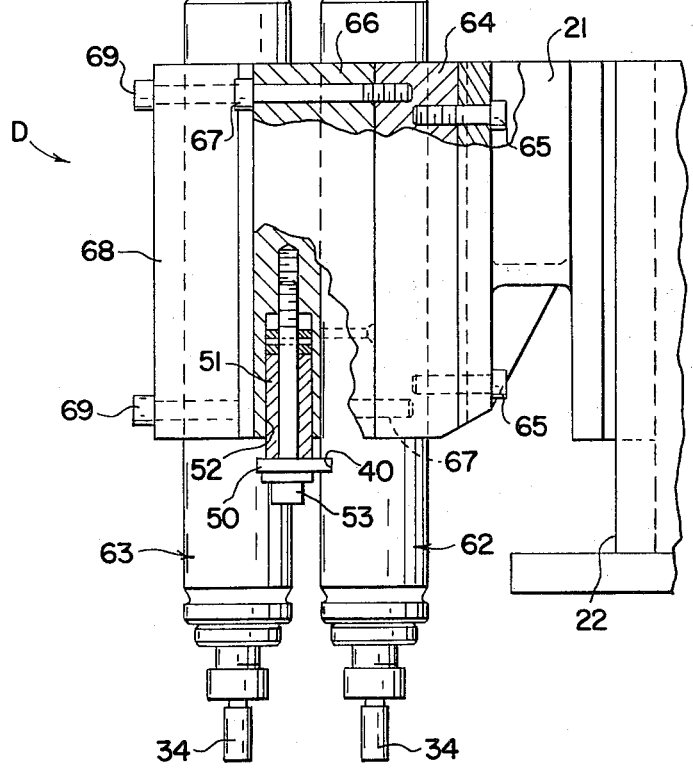
FIG. 7 is an elevational view drawn to the same scale as FIG. 3 illustrating still another alternative form of multiple spindle cluster assembly embodying the invention, with parts broken away for the purpose of illustration.

FIGS. 7 and 8 illustrate still another form of the invention for drilling three holes in a predetermined pattern and spacing using a spindle cluster assembly D. The cluster assembly D is adapted to hold in position three spindles 61, 62 and 63 in the machine A and it will be understood that an identical spindle cluster assembly (not shown) would be located below the assembly D with its spindles in coaxial alignment with the spindles 61, 62 and 63.

The assembly D comprises a main adapter 64 bolted to the slide 21 with machine screws 65. The spindles 61 and 62 are clamped to the main adapter 64 with a secondary adapter 66 that functions for this purpose as a clamp. The main adapter 64 and secondary adapter 66 have cylindrical 180° recesses matching the cylindrical spindle housings as in the previous forms of the invention.

The spindle 63 is clamped to the forward end of the secondary adapter 66 with a spindle clamp 68 using machine screws 69. The resulting spindle cluster provides for drilling a three hole pattern wherein the pattern is of a triangular configuration. It will be apparent that by constructing adapters and clamps in a similar manner many other patterns and spacings may be obtained.

For driving the three spindles 61, 62 and 63 at the same speed it is necessary to use two belts 71 and 72 driven from a pair of drive pulleys (not shown) on the drive motor. The belt 71 is located above the belt 72 with sufficient clearance therebetween. The belt 71 drives pulleys 73 and 74 on the spindles 61 and 62 respectively while the belt 72 drives a pulley 75 on the spindle 63.

It will be noted that with this arrangement the spindles are all accurately secured in their predetermined positions relative to the slide and to one another with the specially machined adapter and clamp members. The fine adjustment of the axial positions of the drills is accomplished at the time of initial setup and also periodically during use of the early spindle cluster assemblies B, C and D to assure that each of the drill tips are in the proper plane with respect to the others and with respect to the glass sheet to be drilled. Normally one of the spindles is used as a reference and need not have an adjustment means, the other spindles being adjusted with respect to the reference spindle.

While the invention has been shown and described with respect to specific embodiments thereof these are intended for the purpose of illustration rather than limitation and other modifications and variations of the specific forms of the invention herein shown and described will be apparent to those skilled in the art all within the intended spirit and scope of the invention. Accordingly the patent is not to be limited to the specific embodiments herein shown and described nor in any other way that is inconsistent with the extent to which the progress in the art has been advanced by the invention.

We claim:

1. Apparatus for drilling a plurality of holes simultaneously in a glass sheet with a pair of opposed drilling assemblies located on opposite sides of the sheet and adapted to be fed alternatively toward and into said sheet, comprising for each drilling assembly:
   a slide,
   means for reciprocating said slide and for applying required pressure for drilling said glass sheet
   a plurality of spindles and drills therefor,
   means operatively connected to said spindles for turning said drills at like speeds
   at least one adapter connected to said slide,
   at least one spindle clamp attachable to said adapter and cooperable therewith to support said spindles with their respective axis parallel and in a predetermined pattern and spacing relative to one another, and
   means operatively associated with said clamps for adjusting said spindles axially relative to one another whereby the drill tips may be positioned in a common plane parallel to said glass sheet.

2. Apparatus as defined in claim 1 wherein said means for applying required drilling pressure comprises a fluid cylinder, a piston in said cylinder operatively connected to said slide and fluid pressure means operatively connected to said fluid cylinder to operate said piston and said slide at a constant feed rate.

3. Apparatus as defined in claim 2 wherein said fluid pressure means comprises a fluid pressure source adapted to supply pressure substantially greater than the pressure required for drilling, and flow restricting means for controlling the feed rate to provide a constant feed rate for said drills regardless of the loads encountered.

4. Apparatus as defined in claim 1 wherein said spindles comprises cylindrical housings and wherein at least two of said spindles have flat surfaces machined in their respective housings parallel to their respective axes whereby said two spindles may be positioned with the flat surfaces of their housings abutting one another to provide minimal spacing between their axes.

5. Apparatus as defined in claim 1 wherein said means for turning said drills at like speeds comprises a drive motor adapted to be reciprocated with said slide, at least one pulley on said motor, a belt driven by said motor pulley, and a pulley for each of said spindles.

6. Apparatus as defined in claim 5 wherein said motor has a plurality of pulleys, each of which drives a belt and wherein each belt drives at least one spindle pulley.

7. Apparatus as defined in claim 6 comprising at least three spindles and wherein at least two spindle pulleys are driven by one belt.

8. Apparatus as defined in claim 1 wherein said means for adjusting said spindles axially comprises a lateral slot formed in the respective spindle, a key adapted for engagement with said slot, a threaded element operatively connected to said key and threadedly connected to the respective spindle clamp for turning movement about an axis parallel to said spindle axis, whereby turning movement of said threaded element adjusts said spindle in an axial direction.

* * * * *